(12) United States Patent
Tuttle et al.

(10) Patent No.: US 6,522,745 B1
(45) Date of Patent: *Feb. 18, 2003

(54) DIGITAL ACCESS ARRANGEMENT CIRCUITRY AND METHOD HAVING A SYNTHESIZED RINGER IMPEDANCE FOR CONNECTING TO PHONE LINES

(75) Inventors: George Tyson Tuttle, Austin, TX (US); Jeffrey W. Scott, Austin, TX (US); Navdeep S. Sooch, Austin, TX (US); David R. Welland, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/347,688

(22) Filed: Jul. 2, 1999

Related U.S. Application Data

(63) Continuation-in-part of application No. 09/098,489, filed on Jun. 16, 1998, and a continuation-in-part of application No. 09/034,455, filed on Mar. 4, 1998, and a continuation-in-part of application No. 09/035,779, filed on Mar. 4, 1998, and a continuation-in-part of application No. 09/034,620, filed on Mar. 4, 1998, and a continuation-in-part of application No. 09/035,175, filed on Mar. 4, 1998, and a continuation-in-part of application No. 08/841,409, filed on Apr. 22, 1997, now Pat. No. 6,137,827, and a continuation-in-part of application No. 08/837,702, filed on Apr. 22, 1997, now Pat. No. 5,870,046, and a continuation-in-part of application No. 08/837,714, filed on Apr. 22, 1997.

(51) Int. Cl.[7] .......................... H04M 1/00; H04M 9/00; H04M 11/00
(52) U.S. Cl. .............................. 379/399.01; 379/399.02; 379/403; 379/413.01; 379/412; 379/413.02; 379/93.05
(58) Field of Search ................................ 379/373, 377, 379/398, 399, 405, 412, 413, 379; 341/110, 143; 375/219, 259; 455/554–559

(56) References Cited

U.S. PATENT DOCUMENTS 4,053,720 A 10/1977 Wycheck ..................... 179/99

(List continued on next page.)

OTHER PUBLICATIONS

Boser et al., *The Design of Sigma–Delta Modulation Analog–to–Digital Converters*, IEEE J. Solid–State Circuits, vol. SC–23, pp. 1298–1308, Dec. 1988.

(List continued on next page.)

*Primary Examiner*—Forester W. Isen
*Assistant Examiner*—Ramnandan Singh
(74) *Attorney, Agent, or Firm*—O'Keefe, Egan & Peterman, LLP

(57) ABSTRACT

A digital direct access arrangement (DAA) circuitry may be used to terminate the telephone connections at the user's end to provide a communication path for signals to and from the phone lines. Briefly described, a means for providing a proper ringer impedance for a variety of international phone standards while also providing a proper isolation barrier to the phone line is disclosed. More particularly, a DAA circuitry may be utilized which satisfies many or all ringer impedance standards without the use of additional discrete impedance devices. The ringer impedance standards may be satisfied by use of an impedance structure coupled between the TIP and RING lines and actively controlling the current drawn through the hookswitch devices when a ringing event is detected so as to control the impedance seen at the TIP and RING lines during a ringing event. The detection of the ringing event may be performed on the phone line side of an isolation barrier. By controlling the current drawn from the phone lines with the hookswitch circuitry, an impedance placed in parallel with the TIP and RING lines may in effect be synthesized. In one embodiment the impedance of the impedance structure may be infinity (i.e., the impedance structure across the TIP and RING lines is not utilized). In this case, the current drawn through the hookswitch will sufficiently synthesize an impedance across (or in parallel with) the TIP and RING lines that dominates and effectively sets the impedance seen at the TIP and RING lines. The DAA may also include means for transmitting and receiving a signal across a capacitive isolation barrier.

37 Claims, 10 Drawing Sheets

U.S. PATENT DOCUMENTS

| | | | | |
|---|---|---|---|---|
| 4,192,978 | A | 3/1980 | Vincent | 179/170 NC |
| 4,216,426 | A | 8/1980 | Flora | 455/28 |
| 4,271,526 | A | 6/1981 | Flora | 375/17 |
| 4,292,595 | A | 9/1981 | Smith | 330/10 |
| 4,417,099 | A | 11/1983 | Pierce | 179/2 DP |
| 4,529,845 | A | 7/1985 | Boeckmann | 179/84 L |
| 4,540,854 | A | 9/1985 | Beirne | 179/18 FA |
| 4,567,331 | A | 1/1986 | Martin | 179/170 NC |
| 4,644,526 | A | 2/1987 | Wu | 370/30 |
| 4,741,031 | A | 4/1988 | Grandstaff | 379/375 |
| 4,757,528 | A | 7/1988 | Falater et al. | 379/412 |
| 4,835,486 | A | 5/1989 | Somerville | 330/10 |
| 4,843,339 | A | 6/1989 | Burt et al. | 330/10 |
| 4,864,605 | A | 9/1989 | Ramsay et al. | 379/379 |
| 4,901,275 | A | 2/1990 | Hardie et al. | 364/900 |
| 4,975,949 | A | * 12/1990 | Wimsatt et al. | 379/387 |
| 4,993,063 | A | 2/1991 | Kiko | 379/405 |
| 4,995,111 | A | 2/1991 | Tojo et al. | 379/382 |
| 5,068,659 | A | 11/1991 | Sakaguchi | 341/143 |
| 5,097,503 | A | 3/1992 | Cotty | 379/399 |
| 5,136,630 | A | 8/1992 | Breneman et al. | 379/64 |
| 5,204,896 | A | 4/1993 | Oliver | 379/106 |
| 5,235,634 | A | 8/1993 | Oliver | 379/106 |
| 5,245,654 | A | 9/1993 | Wilkison et al. | 379/405 |
| 5,287,107 | A | 2/1994 | Gampell et al. | 341/137 |
| 5,329,281 | A | 7/1994 | Baumgartner et al. | 341/139 |
| 5,329,585 | A | 7/1994 | Susak et al. | 379/399 |
| 5,337,338 | A | 8/1994 | Sutton et al. | 377/33 |
| 5,369,666 | A | 11/1994 | Folwell et al. | 375/8 |
| 5,384,808 | A | 1/1995 | Van Brunt et al. | 375/36 |
| 5,410,594 | A | 4/1995 | Maruyama | 379/398 |
| 5,428,682 | A | 6/1995 | Apfel | 379/413 |
| 5,500,894 | A | 3/1996 | Hershbarger | 379/399 |
| 5,500,895 | A | 3/1996 | Yurgelites | 379/412 |
| 5,506,900 | A | 4/1996 | Fritz | 379/402 |
| 5,533,053 | A | 7/1996 | Hershbarger | 375/257 |
| 5,563,942 | A | * 10/1996 | Tulai | 379/351 |
| 5,602,912 | A | 2/1997 | Hershbarger | 379/402 |
| 5,654,984 | A | * 8/1997 | Hershbarger et al. | 375/257 |
| 5,655,010 | A | 8/1997 | Bingel | 379/93.28 |
| 5,675,640 | A | * 10/1997 | Tappert et al. | 379/373 |
| 5,692,041 | A | 11/1997 | Torazzina | 379/379 |
| 5,790,656 | A | 8/1998 | Rahamim et al. | 379/399 |
| 5,796,815 | A | * 8/1998 | Guercio et al. | 379/372 |

OTHER PUBLICATIONS

Candy, *A Use of Double Integration in Sigma Delta Modulation*, IEEE Trans. Commun., vol. COM–33, pp. 249–258, Mar. 1985.

Naus, et al., *A CMOS Stereo 16–bit D/A Converter for Digital Audio*, IEEE J. Solid–State Circuits, vol. SC–22, pp. 390–395, Jun. 1987.

Silicon Systems, *SSI 73D2950/2950T Low Power FAX/Data Modem Chip Set Advance Information*, pp. 4–75—4–105, Dec. 1993.

Siemens, "*Ics For Communications Analog Line Interface Solution ALIS*", PSB 4595 Version 2.0 and PSB 4596 Version 2.1 Product Overview 08.97, 19 pages (1997).

Krypton, "*K²930G Functional and Electrical Descriptions*", 10 pages (1997).

Lucent Technologies, *LUCL8576 Dual Subscriber Line Interface Circuit*, Advanced Data Sheet Issue 1.3, 15 pages, Jan. 8, 1997.

Information Sheet—Siemens, DAA2000 Optical DAA Kit—Preliminary, pp. 1–21; Jun. 13, 1997.

Siemens Press Release, *Siemens Pioneers Programmable Front End for Analog Modems Single Design for Worldwide Standards*, Aug. 6, 1997.

Information Sheet—*Siemens, ICs for Communications, ALIS Reference Board*, SIPB 4595 Version 1.0, Technical Description 06.97, Q67220–H1014, Jun. 1997.

Information Sheet—*Siemens, ICs for Communications, ALIS Evaluation Board*, SIPB 45900 Version 1.1, Technical Description 06.97, Q67220–H1047, Jun. 1997.

Information Sheet—*Siemens, ALIS—Development Tools Evaluation Board*, pp. 1–3, Jul. 21, 1997.

International Search Report (Dec. 21, 1998) (from 928PCT).

Information Sheet—*Siemens, ICs for Communications Analog Network Interface Circuit ANIC*, PSB 4450 Version 1.1 and PSB 4451 Version 1.1, Preliminary Data Sheet 02.99 (Feb. 1999).

SmartMC Modem Codec, *Host–Processed, V.90/K56flex Modem Codec (MC) Device Set with SmartDAA Technology for AC–Link (AC'97 2.1) Applications*, Data Sheet (Mar. 12, 1999).

* cited by examiner

DIGITAL ACCESS ARRANGEMENT CIRCUITRY AND METHOD HAVING A SYNTHESIZED RINGER IMPEDANCE FOR CONNECTING TO PHONE LINES

This application is a continuation-in-part application of U. S. Ser. No. 08/841,409 now U.S. Pat. No. 6,137,827, U.S. Ser. No. 08/837,702 now U.S. Pat. No. 5,870,046 and U.S. Ser. No. 08/837,714 all filed on Apr. 22, 1997; and a continuation-in-part application of U.S. Ser. Nos. 09/034,455, 09/035,779, 09/034,620, and 09/035,175 all filed on Mar. 4, 1998; and a continuation-in-part application of U.S. Ser. No. 09/098,489 filed on Jun 16, 1998, all of which are expressly incorporated herein by reference.

TECHNICAL FIELD OF THE INVENTION

This invention relates to the field of digital access arrangement circuitry. More particularly, this invention relates to digital access arrangement circuitry for connecting to a variety of phone line standards. The digital access arrangement circuitry may further include isolation barrier utilizing a capacitor coupled isolation barrier.

BACKGROUND

Direct Access Arrangement (DAA) circuitry may be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines.

Generally, governmental regulations specify the telephone interface requirements and specifications for a variety of parameters including AC termination, DC termination, ringer impedance, ringer threshold, etc. For example, Federal Communications Commission (FCC) Part 68 governs the interface requirements for telephones in the United States. However, the interface requirements world wide are not standardized, and thus, in countries other than the United States the applicable standards may include the CTR21, TBR21, NET4, JATE, and various country specific PTT specifications. Because the interface requirements are not standardized from country to country, often different DAA circuitry is required for use in each country in order to comply with the appropriate standard. The requirement for different DAA circuitry, however, limits the use of one phone line interface in a variety of countries. Thus, for example, a modem in a laptop computer configured for interfacing with a phone line in one country may not necessarily operate properly in another country. Further, the requirement for different DAA circuitry in various countries hinders the design of a single integrated cost effective DAA solution for use world wide.

As mentioned above, the telephone interface requirements generally include specifications for the ringer impedance presented to the telephone line. Most countries and specifications merely have a minimum impedance which must be presented to the TIP and RING lines during a ringing event. However, some countries also have a maximum ringer impedance limit. In some cases these specifications may be contradictory. For example, before the implementation of the pan-European CTR21 specification, Germany required the ringer impedance presented at the tip and ring lines to be less than 20 kohms (at 25 Hz) while Austria required the ringer impedance to exceed 20 kohms (at 50 Hz). Even with the acceptance of the CTR21 in much of Europe, some countries still have maximum limits for the ringer impedance. For example, the maximum allowable ringer impedance (at country defined frequencies and rms line voltage) in the Czech Republic is 10 kohms, in South Africa is 60 kohms, in Poland is 30 kohms and in South Korea is 50 kohms. In the United States, the TIA/EIA 470B standard requires a maximum ringer impedance of 40 kohms at 20 Hz and 45 Vrms, however, this standard is generally not enforced.

One traditional approach to satisfy the various different ringer impedance requirements is to provide devices (such as discrete resistors and capacitors) between the TIP and RING lines external to the DAA integrated circuit. The values of discrete components may then be selected to meet the ringer impedance requirements for specific countries. Thus, the different circuitry may be required for different countries and circuitry meeting the ringer requirements of one country may not be suitable for use in other countries.

Thus, it is desirable to provide a DAA circuitry that may be suitable for use in many or all countries without the need for hardware or discrete device changes. Further, it is even more desirable to provide a DAA circuit that does not require the use of any external discrete impedance devices to provide the ringer impedance.

Further, it is also desirable that the DAA circuitry act as an isolation barrier since an electrical isolation barrier must exist in communication circuitry which connects directly to the standard two-wire public switched telephone network and that is powered through a standard residential wall outlet. For example, in order to achieve regulatory compliance in the United States with Federal Communications Commission Part 68, which governs electrical connections to the telephone network in order to prevent network harm, an isolation barrier capable of withstanding 1000 volts rms at 60 Hz with no more than 10 milliamps current flow, must exist between circuitry directly connected to the two wire telephone network and circuitry directly connected to the residential wall outlet.

Thus, there exists a need for reliable, accurate and inexpensive DAA circuitry for satisfying the ringer impedance standards for multiple country phone line standards and a DAA circuitry which also provides the necessary electrical isolation barrier.

SUMMARY OF THE INVENTION

The above-referenced problems are addressed by the present invention, which provides a reliable, inexpensive, DAA circuit that may be utilized with multiple telephone interface standards and which also provides an isolation system that is substantially immune to noise that affects the timing and/or amplitude of the signal that is transmitted across the isolating element, thus permitting an input signal to be accurately reproduced at the output of the isolation system.

The present invention provides digital direct access arrangement (DAA) circuitry that may be used to terminate the telephone connections at the user's end to provide a communication path for signals to and from the phone lines. Briefly described, the invention provides a means for providing a proper ringer impedance for a variety of international phone standards. The invention may also be utilized with means for transmitting and receiving a signal across a capacitive isolation barrier. More particularly, a DAA circuitry may be utilized which satisfies many or all ringer impedance standards without the use of additional discrete impedance devices. The ringer impedance standards may be satisfied by use of an impedance structure coupled between the TIP and RING lines and actively controlling the current drawn through the hookswitch devices when a ringing event is detected so as to control the impedance seen at the TIP and RING lines during a ringing event. The detection of the ringing event may be performed on the phone line side of an isolation barrier. By controlling the current drawn from the phone lines with the hookswitch circuitry, an impedance placed in parallel with the TIP and RING lines may in effect be synthesized. In one embodiment the impedance of the impedance structure may be infinity (i.e. the impedance structure across the TIP and RING lines is not utilized). In this case, the current drawn through the hookswitch will sufficiently synthesize an impedance across (or in parallel with) the TIP and RING lines that dominates and effectively sets the impedance seen at the TIP and RING lines.

In one embodiment, a communication system is provided. The communication system may include phone line side circuitry that may be coupled to phone lines; powered side circuitry that may be coupled to the phone line side circuitry through an isolation barrier; and hookswitch circuitry within the phone line side circuitry. The hookswitch circuitry may draw current during ringer events to synthesize a ringer impedance.

In another embodiment, a method of operating a communication system is provided that may be coupled to a phone line. The method may include coupling an isolation barrier between powered circuitry and phone line side circuitry; providing hookswitch circuitry within the phone line side circuitry; and generating a substantial portion of a ringer impedance seen at the phone line by drawing current through the hookswitch circuitry.

A ringer impedance circuit within a communication system that may be connected to phone lines is provided in yet another embodiment. The ringer impedance circuit may comprise a ringer detect signal; and at least impedance generating circuit coupled to the ringer detect signal, the at least one impedance generating circuit responsive to the ringer detect signal to provide a ringer impedance.

Yet another embodiment of the present invention includes a method of providing a ringer impedance capable of satisfying a plurality of ringer impedance standards. The method may comprise generating a ring detect signal; and adjusting the ringer impedance present at a phone line in response to the ring detect signal.

A method of generating a ringer impedance for a phone line is also provided. The method may comprise actively controlling at least one circuit of a DAA circuit; and substantially setting the ringer impedance present at the phone line by the active control of the at least one circuit.

In still another embodiment, an integrated circuit compatible with a plurality of phone line standards having ringer impedance requirements is provided. The integrated circuit may include a ringer detect signal; and at least one control signal generated in response to the ringer detect signal, the control signal operable to adjust the ringer impedance present at a phone line.

DESCRIPTION OF THE DRAWINGS

So that the manner in which the herein described advantages and features of the present invention, as well as others which will become apparent, are attained and can be understood in detail, a more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

DESCRIPTION OF PREFERRED EMBODIMENTS

Figure 1:
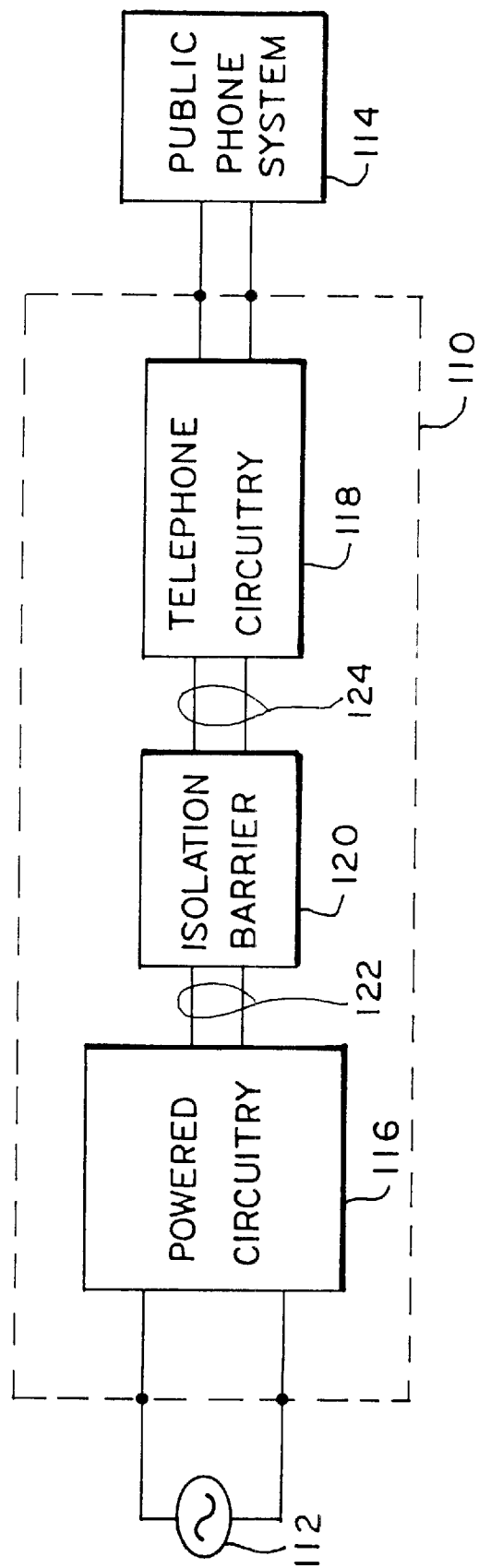
FIG. 1 is a block diagram of a telephone set illustrating a typical application of the present invention.

In order to provide a context for understanding this description, FIG. 1 illustrates a typical application for the present invention: a telephone that includes circuitry powered by a source external to the phone system. A basic telephone circuit 118 is powered by the "battery" voltage that is provided by the public telephone system and does not have a separate power connection. Many modem phones 110, however, include radio (cordless), speakerphone, or answering machine features that require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 (isolated circuitry may also be called phone line side circuitry) that is connected to the phone lines, to prevent dangerous or destructive voltage or current levels from entering the phone system. (Similar considerations exist in many other applications as well, including communication, medical and instrumentation applications in which this invention may be beneficially applied.) The required isolation is provided by isolation barrier 120. The signal that passes through the isolation barrier 120 is an analog voice signal in a typical telephone application, but it may also be a digital signal or a multiplexed signal with both analog and digital components in various applications. In some applications, communication across isolation barrier 120 may be unidirectional (in either direction), but in many applications, including telephony, bidirectional communication is required. Bidirectional communication may be provided using a pair of unidirectional isolator channels, or by forming a single isolation channel and multiplexing bidirectional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
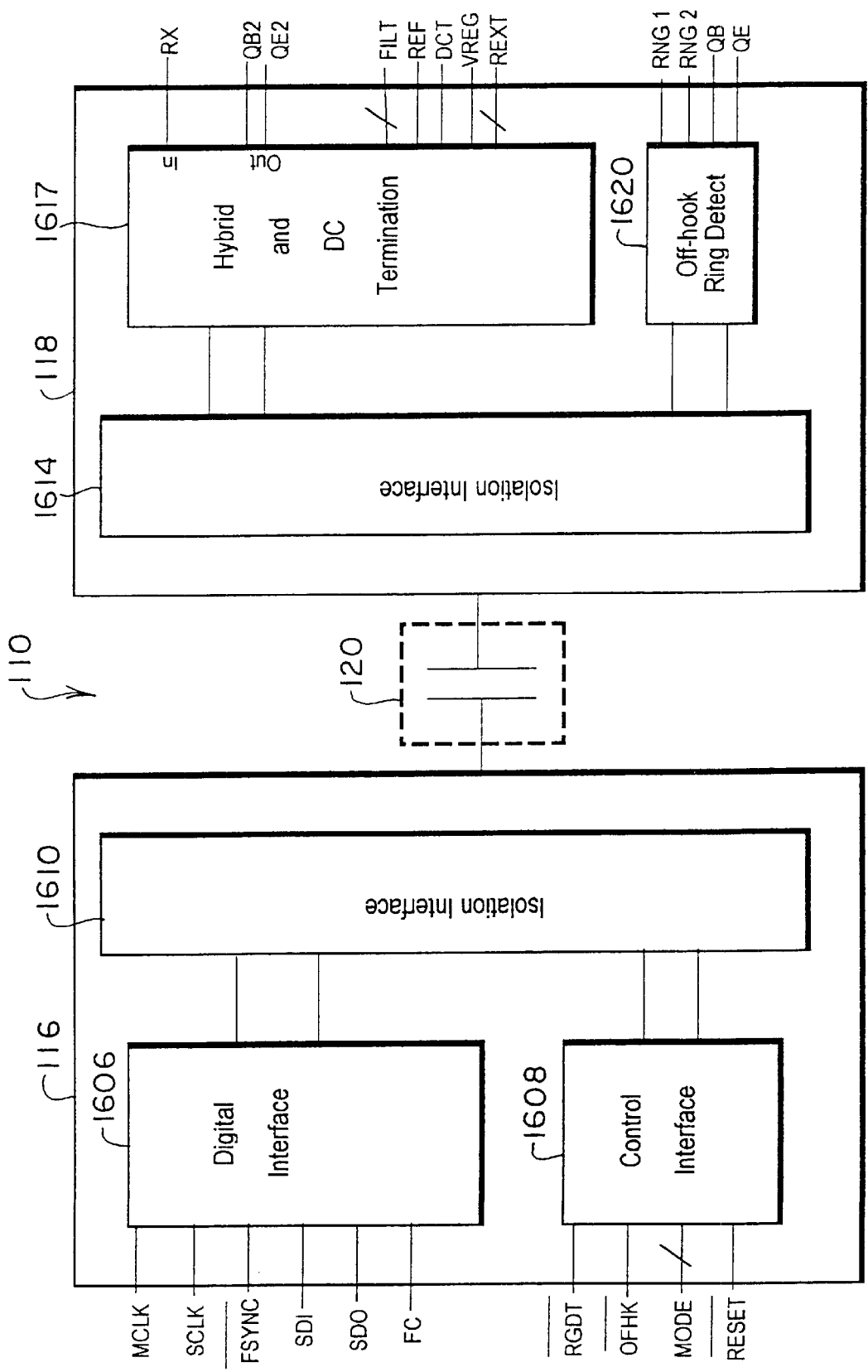
FIG. 2 is a general block diagram of digital DAA circuitry including phone line side circuitry, an isolation barrier, and powered side circuitry according to the present invention.

FIG. 2 is a general block diagram of digital DAA circuitry 110 including phone line side circuitry 118, an isolation barrier 120, and powered side circuitry 116 according to the present invention. The isolation barrier 120 may include one or more capacitors and allow for the transmission of digital information between the isolation interface 1614 in the phone line side circuitry and the isolation interface 1610 in the powered side circuitry. The phone line side circuitry 118 may be connected to phone lines of a telephone network system, and the powered side circuitry 116 may be connected to external controllers, such as digital signal processors (DSP), that may be part of a communication device, such as a phone or modem.

The powered side circuitry 116, which may be implemented as an integrated circuit (IC), may communicate with the external controller through a digital interface 1606 and a control interface 1608. For example, the digital interface 1606 may have a number of external pins providing a serial port interface to the external controller, such as a master clock input pin (MCLK), a serial port bit clock output (SCLK), a serial port data IN pin (SDI), a serial port data OUT pin (SDO), a frame sync output pin (FSYNC_bar) (it is noted that the suffix "_bar" is used to denote a signal that is typically asserted when at a low logic level), and a secondary transfer request input pin (FC). Similarly, the control interface 1608 may have a number of external pins providing control and status information to and from the external controller, such as a ring detect status pin (RGDT_bar), an off-hook status pin (OFHK_bar), a reset pin (RESET_bar), and multiple mode select pins (MODE). In addition, the digital interface 1606 and the control interface 1608 are connected to the isolation interface 1610 so that control, status, signal and other desired information may be transmitted to and received from the phone line side circuitry 118 across the isolation barrier 120.

The phone line side circuitry 118, which may be implemented as an integrated circuit (IC), may communicate with the phone lines through hybrid and DC termination circuitry 1617 (the DC termination circuitry provides an internal power supply voltage), and determine ring-detect and off-hook status information through off-hook/ring-detect block 1620. In addition, the hybrid and DC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of the hybrid and DC termination circuitry 1617 has an output pin QE2 and an input pin (RX) that may connect to external telephone interface circuitry such as hook-switch circuitry and a diode bridge. The hybrid circuitry may function to split the differential signal existing on the phone, which typically includes both transmit and receive analog information, into an internal transmit signal ($TX_{INT}$) and receive signal ($RX_{INT}$). It is noted that the QE2 output pin is used to transmit analog information to the phone lines, and that the RX pin is labeled to indicate that it is used to receive analog information from the phone lines. These external pin signals are different than the internal analog transmit signal ($TX_{INT}$) and analog receive signal ($RX_{INT}$).

Figure 4A:
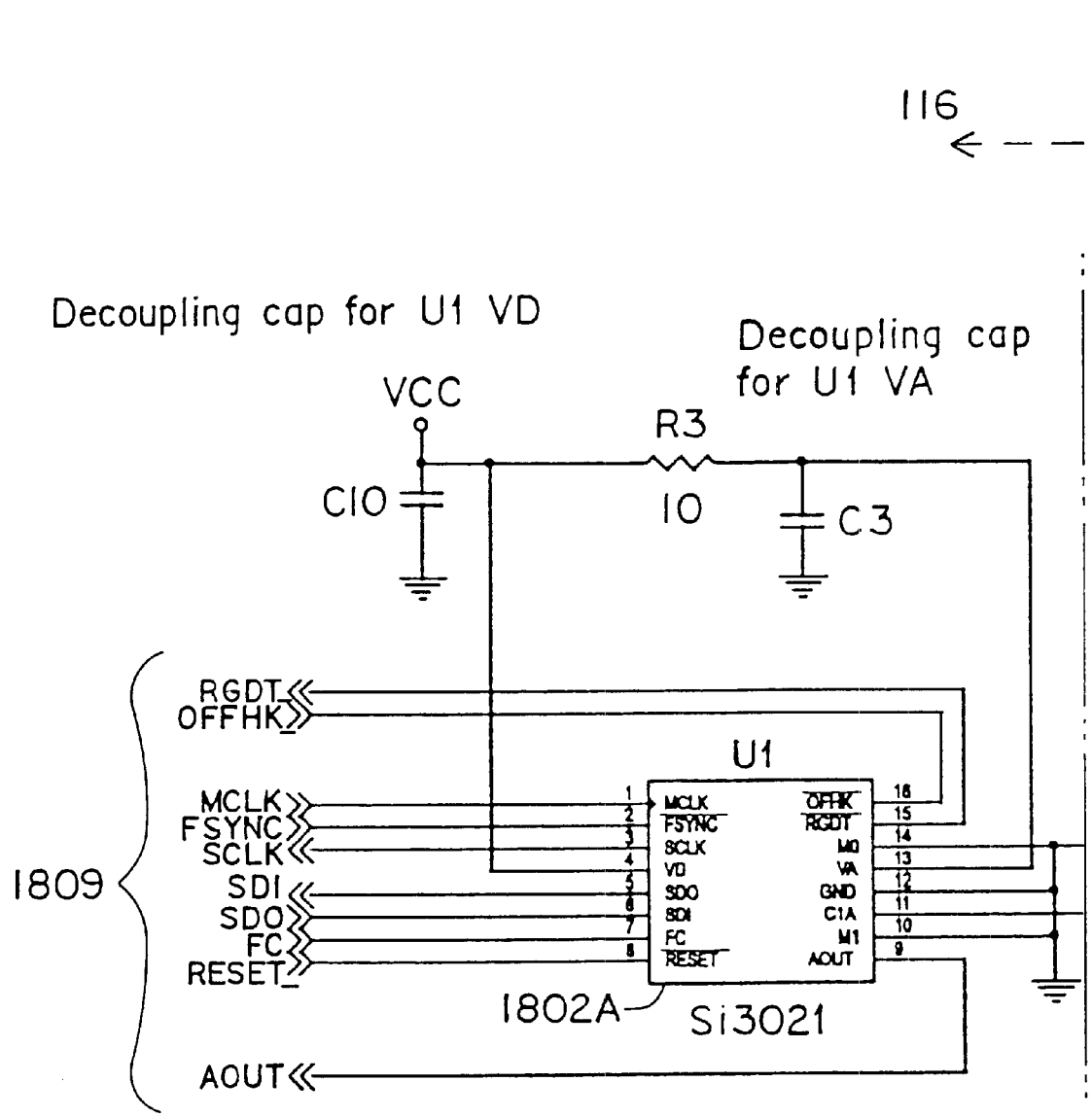
FIG. 4 is a general circuit diagram of digital DAA circuitry implemented with two integrated circuits (ICs), a capacitive isolation barrier, and external circuitry according to the present invention.
Figure 4:
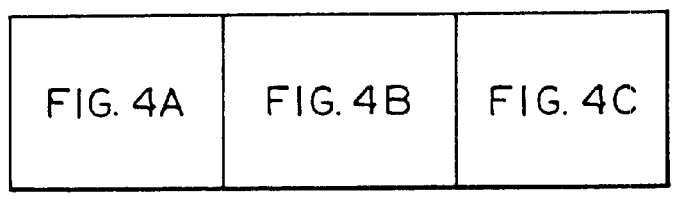
Figure 4B:
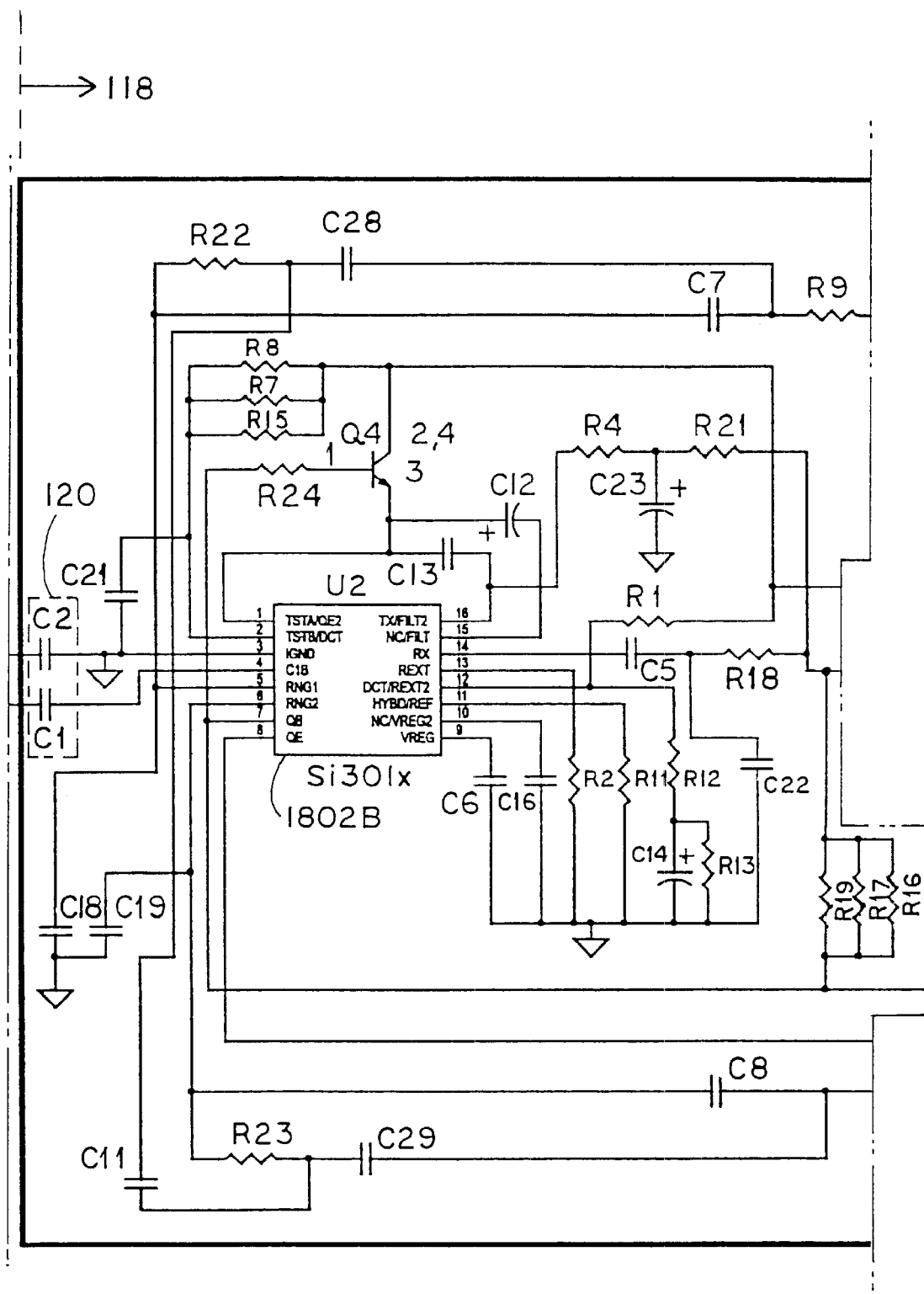
Figure 4C:
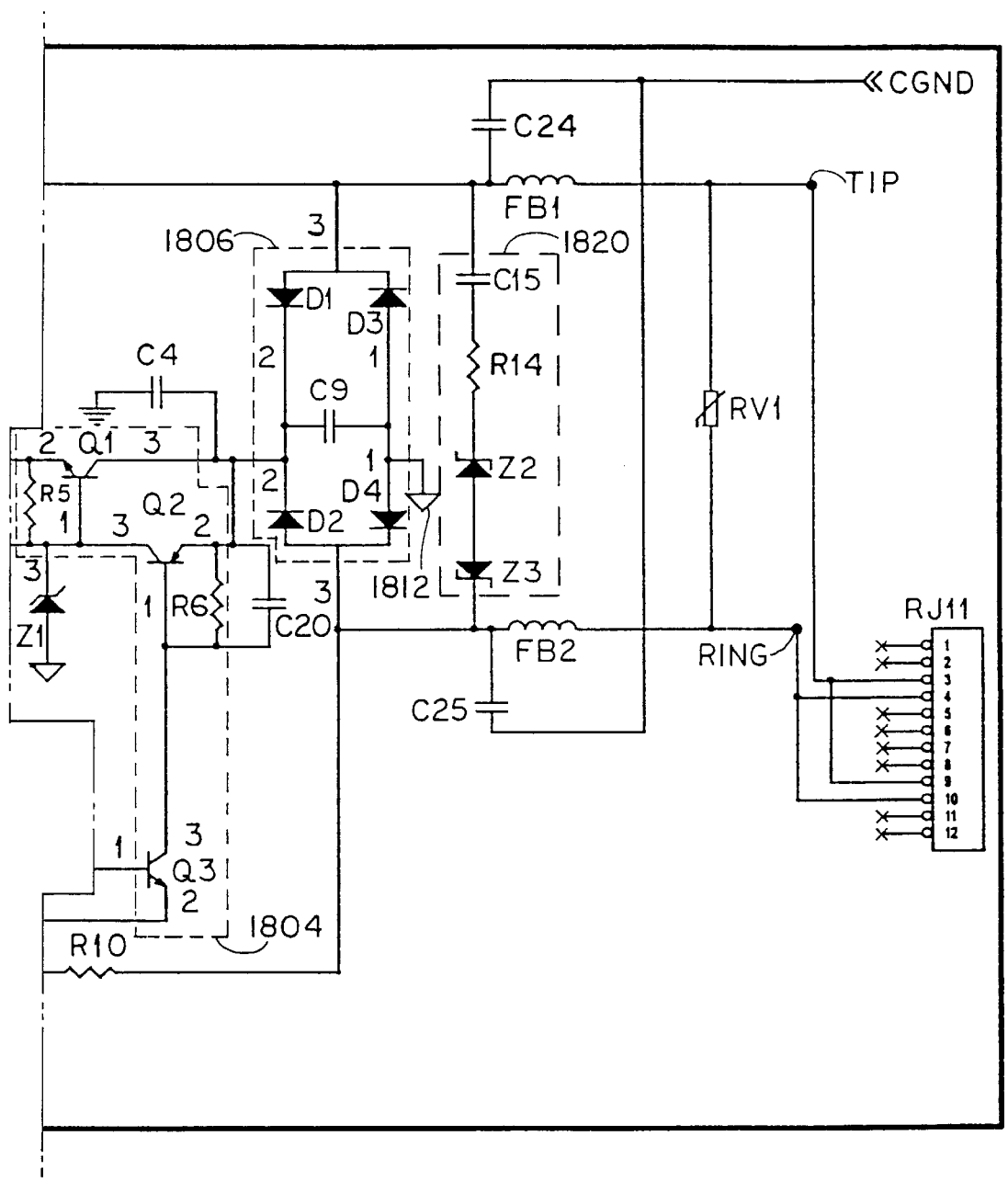

The hybrid and DC termination circuitry 1617 may have a number of external pins that also connect to external telephone interface circuitry such as hook-switch circuitry and a diode bridge as shown in FIGS. 2 and 4. For example, the hybrid and DC termination circuitry 1617 may have a DC termination pin (DCT), a voltage regulator pin (VREG), two external resistor pins (REXT and REXT2), two filter pins (FILT and FILT2) and an isolated ground pin (IGND). The DC termination circuitry terminates the DC voltage on the phone line and provides an internal power supply for the phone line side circuitry 118. The DC termination pin (DCT) receives a portion of the phone line DC current with the remainder flowing through pins QE2 and QB2, depending upon the termination mode and DC current level. The voltage regulator pin (VREG) allows external regulator circuitry, such as a capacitor, to be connected to the DC termination circuitry 1617. External resistors and a capacitor may be connected to the two external resistor pins (REXT and REXT2) to set the real and complex AC termination impedance respectively. The filter pin FILT (along with the capacitor C5) sets the time constant for the DC termination circuit. The filter pin FILT2 sets the off hook/on hook transient responses for pulse dialing. The isolated ground pin (IGND) may be connected to the system ground for the powered side circuitry 116 through a capacitor within the isolation barrier 120 and may also be connected to the phone line through a ground connection within external diode bridge circuitry.

The off-hook/ring-detect block 1620 may have external input pins allowing status information to be provided concerning phone line status information (RNG1, RNG2), such as ring and caller identification signals. For example, the first ring detect pin (RNG1) may connect to the tip (T) lead of the phone line through a capacitor and resistor, and the second ring detect pin (RNG2) may connect to the ring (R) lead of the phone line through a capacitor and resistor. In addition, off-hook/ring-detect block 1620 may have external output pins (QB, QE) that control external off-hook circuitry to enter, for example, an off-hook state or a limited power mode to get caller identification information. More particularly, the output pins (QB, QE) may be connected to the base and emitter, respectively, of a bipolar transistor within external hook-switch circuitry.

Figure 3:
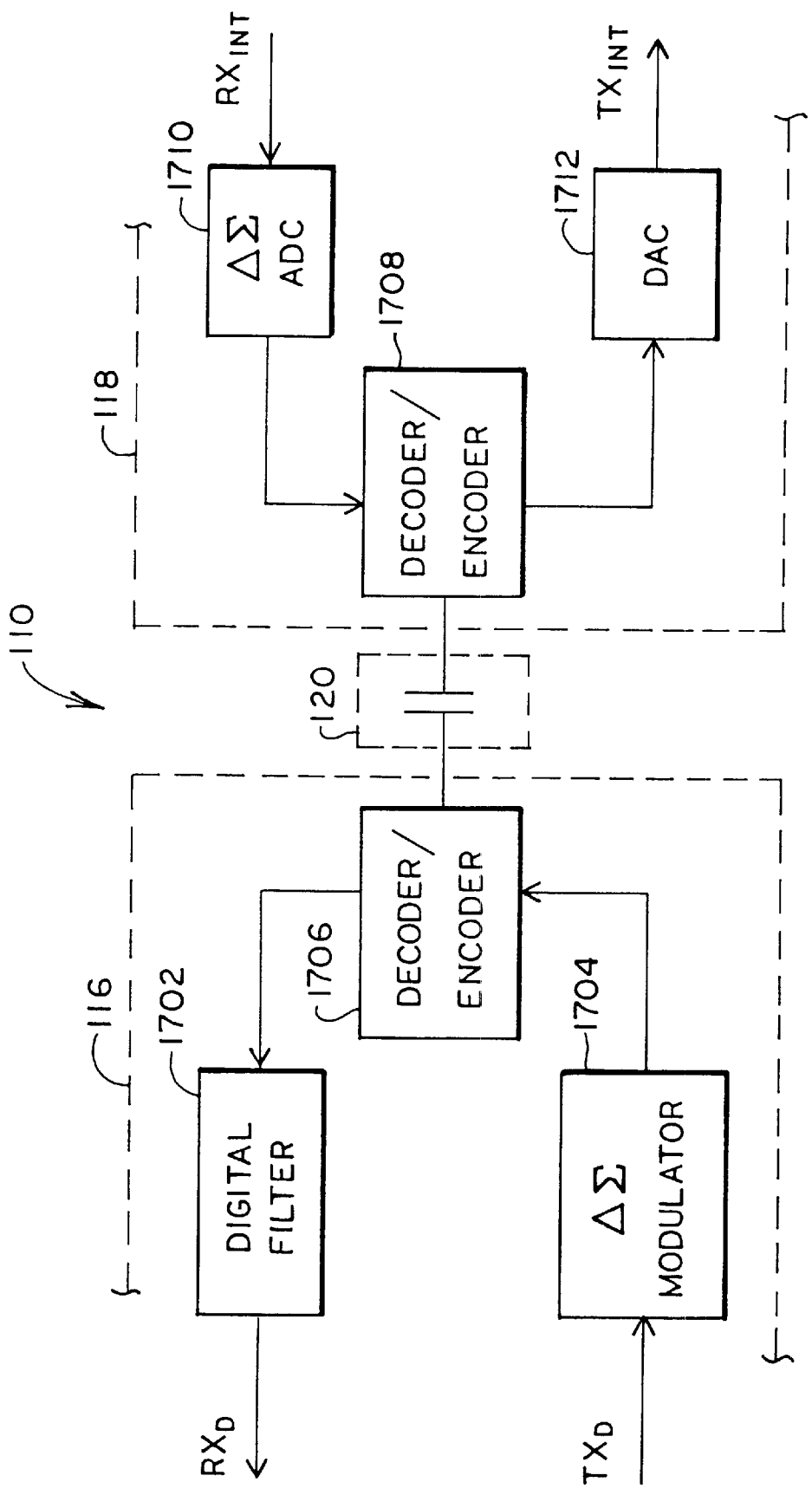
FIG. 3 is a general block diagram of transmit and receive signal paths within digital DAA circuitry according to the present invention.

FIG. 3 is a general block diagram of internal transmit (TX) and receive (RX) signal paths within digital DAA circuitry 110 according to the present invention. In the embodiment depicted, information may be communicated in either direction across the isolation barrier 120. It is noted that FIG. 3 does not depict all of the functional blocks within powered side circuitry 116 and phone line side circuitry 118. It is also noted that the blocks depicted may be implemented as numerous additional blocks carrying out similar functions.

In the embodiment of FIG. 3, communications from the phone line side circuitry 118 to the powered circuitry 116 are considered receive signals. Within phone line side circuitry 118, a delta-sigma analog-to-digital converter (ADC) 1710 receives an internal analog receive signal ($RX_{INT}$), which may be provided for example by hybrid circuitry 1617. The output of delta-sigma ADC 1710 is oversampled digital data stream in a pulse density modulation format. The decoder/encoder circuitry 1708 processes and formats this digital information as desired before sending it across the isolation barrier 120 as encoded digital information. For example, decoder/encoder 1708 may multiplex control data with the digital stream before it is sent across the isolation barrier 120. This control data may be any desired information, such as ring detect signals, off-hook detect signals, other phone line status information or data indicative of the country in which the DAA will be utilized (so that the appropriate phone line interface standards will be satisfied). Within powered side circuitry 116, the decoder/encoder 1706 decodes this encoded digital information received across the isolation barrier 120. The digital filter 1702 processes this decoded digital stream and converts it into internal digital receive data ($RX_D$) that may be provided through the digital interface 1606 to an external controller.

Communications from the powered side circuitry 116 to the phone line side circuitry 118 are considered transmit signals. Within powered side circuitry 116, a delta-sigma modulator 1704 receives an internal digital transmit signal ($TX_D$), which may be provided for example from an external controller through digital interface 1606. The output of delta-sigma modulator 1704 is an oversampled digital data stream in a pulse density modulation format. The decoder/encoder circuitry 1706 processes and formats this digital information as desired before sending it across the isolation barrier 120 as encoded digital information. For example, decoder/encoder 1706 may multiplex control data with the digital stream. This control data may be any desired information, such as ring detect signals, off-hook detect signals, or other phone line status information. In addition, decoder/encoder 1706 may add framing information for synchronization purposes to the digital stream before it is sent across the isolation barrier 120. Still further, decoder/encoder 1706 may format the digital data stream so that a clock signal may be recovered within the phone line side circuitry 118. Within phone line side circuitry 118, the decoder/encoder 1708 may recover a clock signal and may decode the encoded digital information received across the isolation barrier 120 to obtain framing, control or status information. The digital-to-analog converter (DAC) 1712 converts the decoded digital stream and converts it into internal analog transmit data ($TX_{INT}$) that may be provided as an analog signal through the hybrid circuitry 1617 and ultimately to the phone lines.

FIG. 4 is a general circuit diagram of digital DAA circuitry 110 implemented with two integrated circuits (ICs) and a capacitive isolation barrier 120 according to the present invention. The DAA circuitry 110 may be coupled to phone line TIP and RING lines as shown. In particular, powered side circuitry 116 may include a powered side integrated circuit (IC) 1802A, and phone line side circuitry 118 may include a phone line side IC 1802B. External discrete devices may be coupled to the TIP line, RING line, phone line side IC 1802B and powered side IC 1802A. The external circuitry may include circuitry, such as hookswitch circuitry 1804, diode bridge circuitry 1806, and impedance circuitry 1820. During an on-hook condition, typical prior art hookswitches may typically be turned off thus not allowing loop current to be drawn from the phone line. Prior art hookswitches may include bipolar and/or relay switches. During an off-hook condition, the switches may be placed in saturation and act as a switch that "seizes" or "collapses" the phone line, i.e. draws all the available phone line current. The communication system disclosed herein allows for the hookswitch devices to draw loop current from the phone line in both on-hook and off-hook conditions. Thus, even though an on-hook condition occurs, current may be obtained through the hookswitch devices. This feature allows circuitry which operates during on-hook conditions to still receive power from the phone line. Moreover because the hookswitch devices are utilized for drawing power in both on-hook and off-hook conditions, the use of additional switches dedicated to drawing the power during on-hook conditions is not required.

In the embodiment depicted in FIG. 4, external pins 1809 of the powered side IC 1802A are connected to an external digital signal processor (DSP) and to a external application specific IC (ASIC) or controller. The isolation barrier 120 may include a first capacitor (C1) connecting an external signal (C1A) pin on the powered side IC 1802A to an external signal (C1B) pin on the phone line side IC 1802B. In addition, the isolation barrier 120 may have a second capacitor (C2) connecting the isolated ground (IGND) pin on the phone line side IC 1802B to the system ground (GND) pin on the powered side IC 1802A. In addition, the isolated ground (IGND) pin may be connected to node 1812 within diode circuitry 1806 (and thereby be connected to the phone line) and the remaining ground connections of the external circuitry of the phone line side circuitry 118. Typical component values for the various external capacitors, resistors, transistors, and diodes for the circuit of FIG. 4 are shown in Table 1 and Table 2. As used in the Tables, when a device is listed as "Not Installed" the device may be considered to be an open circuit. Table 1 illustrates external components that may be used for a global DAA (i.e. for use in multiple countries, including the U.S.) while Table 2 illustrates simplified circuitry for meeting U.S. FCC and CTR21 requirements only. As discussed below in more detail, the components C15, R14, Z2, and Z3 of Table 1 may be not installed for all countries except the Czech Republic.

TABLE 1

Global External Component Values

| Symbol | Value |
|---|---|
| C1,C2 | 150 pF, 2k V, ±20% |
| C3,C6,C10,C16 | 0.1 µF, 16 V, ±20% |
| C4,C11,C23,C28,C29 | NOT INSTALLED |
| C5 | 0.1 µF, 50 V, ±20% |
| C7,C8 | 1800 pF, 300 V +5% |
| C9 | 22 nF, 300 V, ±20% |
| C12 | 0.22 µF, 16 V, ±20% |
| C13 | 0.47 µF, 16 V, ±10% |
| C14 | 0.68 µF, 16 V, ±10% |
| C15 | 1.0 µF, 250 V +20% |
| C18,C19 | 12 nF, 16 V, ±10% |
| C20 | 0.01 µF, 16 V, ±10% |
| C21 | NOT INSTALLED |
| C22 | 1800 pF, 50 V, ±10% |
| C24,C25 | 1000 pF, 2000 V, ±10% |
| R1,R4,R21,R22,R23 | NOT INSTALLED |
| R2 | 402Ω, 1/16W ±1% |
| R3 | NOT INSTALLED |
| R5 | 36kΩ, 1/16W ±5% |
| R6 | 120 kΩ, 1/16W ±5% |
| R7,R8,R15,R16,R17,R19 | 4.87 KΩ, 1/4W ±1% |
| R9,R10 | 15 kΩ, 1/10W ±5% |
| R11 | 10kΩ, 1/16W ±1% |
| R12 | 78.7Ω, 1/16W ±1% |
| R13 | 215Ω, 1/16W ±1% |
| R14 | 7.5 kΩ, 1/4W ±5% |
| R18 | 2.2 kΩ, 1/10W ±15% |
| R24 | 150 Ω, 1/16W ±5% |
| Q1,Q3 | A42, NPN 300 V |
| Q2 | A92, PNP 300 V |
| Q4 | 2N2222 NPN 40 V 1/2W |
| FB1,FB2 | Ferrite Bead |
| RV1 | Sidactor 275 V, 100 A |
| D1–D4 | 1N4004 |
| Z1 | Zener Diode 43 V |
| Z2,Z3 | Zener Diode 5.6 V |

TABLE 2

FCC/CTR21 Only External Component Values

| Symbol | Value |
| --- | --- |
| C1,C2 | 150 pF, 2k V, ±20% |
| C3,C6,C10,C16 | 0.1 µF, 16 V, ±20% |
| C5 | 0.10 µF, 50 V, ±20% |
| C7,C8 | 1800 pF, 250 V +5% |
| C9 | 22 nF, 250 V, ±20% |
| C12 | 0.22 µF, 16 V, Tant, ±10% |
| C13 | 0.47 µF, 16 V, ±10% |
| C18,C19 | 12 nF,16 V, ±10% |
| C20 | 0.01 µF, 16 V, ±10% |
| C22 | 1800 pF, 50 V, ±10% |
| C24,C25 | 1000 pF, 2k V, ±10% |
| C4,C11,C14,C15,C17,C21,C23,C28,C29 | NOT INSTALLED |
| R2 | 402Ω, 1/16W ±1% |
| R5 | 36kΩ, 1/16W ±5% |
| R6 | 120 kΩ, 1/16W ±5% |
| R1,R3,R4,R14,R12,R13,R21,R22,R23 | NOT INSTALLED |
| R9,R10 | 15 kΩ, 1/10W ±5% |
| R7,R8,R15,R16,R17,R19 | 4.87 KΩ, 1/4W ±1% |
| R11 | 10kΩ, 1/16W ±1% |
| R18 | 2.2 kΩ, 1/10W ±5% |
| R24 | 150 Ω, 1/16W ±5% |
| Q1,Q3 | A42, NPN 300 V |
| Q2 | A92, PNP 300 V |
| Q4 | 2N2222 NPN 40 V 1/2W |
| FB1,FB2 | Ferrite Bead |
| RV1 | Sidactor 275 V, 100 A |
| D1–D4 | 1N4004 |
| Z1 | Zener Diode 43 V |
| Z2,Z3 | NOT INSTALLED |

An exemplary embodiment of the present invention will be discussed below with reference to a configuration according to FIG. 4 as configured as shown in Table 1. It will be recognized, however, that the concepts of the present invention may be implemented in other configurations. According to the present invention, DAA circuitry may be utilized which satisfies many or all ringer impedance standards. The ringer impedance standards may be satisfied by use of an impedance structure coupled between the TIP and RING lines and actively controlling the current drawn through the hookswitch devices when a ringing event is detected so as to control the impedance seen at the TIP and RING lines during a ringing event. By controlling the current drawn from the phone lines with the hookswitch circuitry, an impedance placed in parallel with the TIP and RING lines may in effect be synthesized. In one embodiment the impedance of the impedance structure may be infinity (i.e. an impedance structure across the TIP and RING lines is not utilized). In this case, the current drawn through the hookswitch will sufficiently synthesize an impedance across (or in parallel with) the TIP and RING lines that dominates and effectively sets the impedance seen at the TIP and RING lines.

Figure 5:
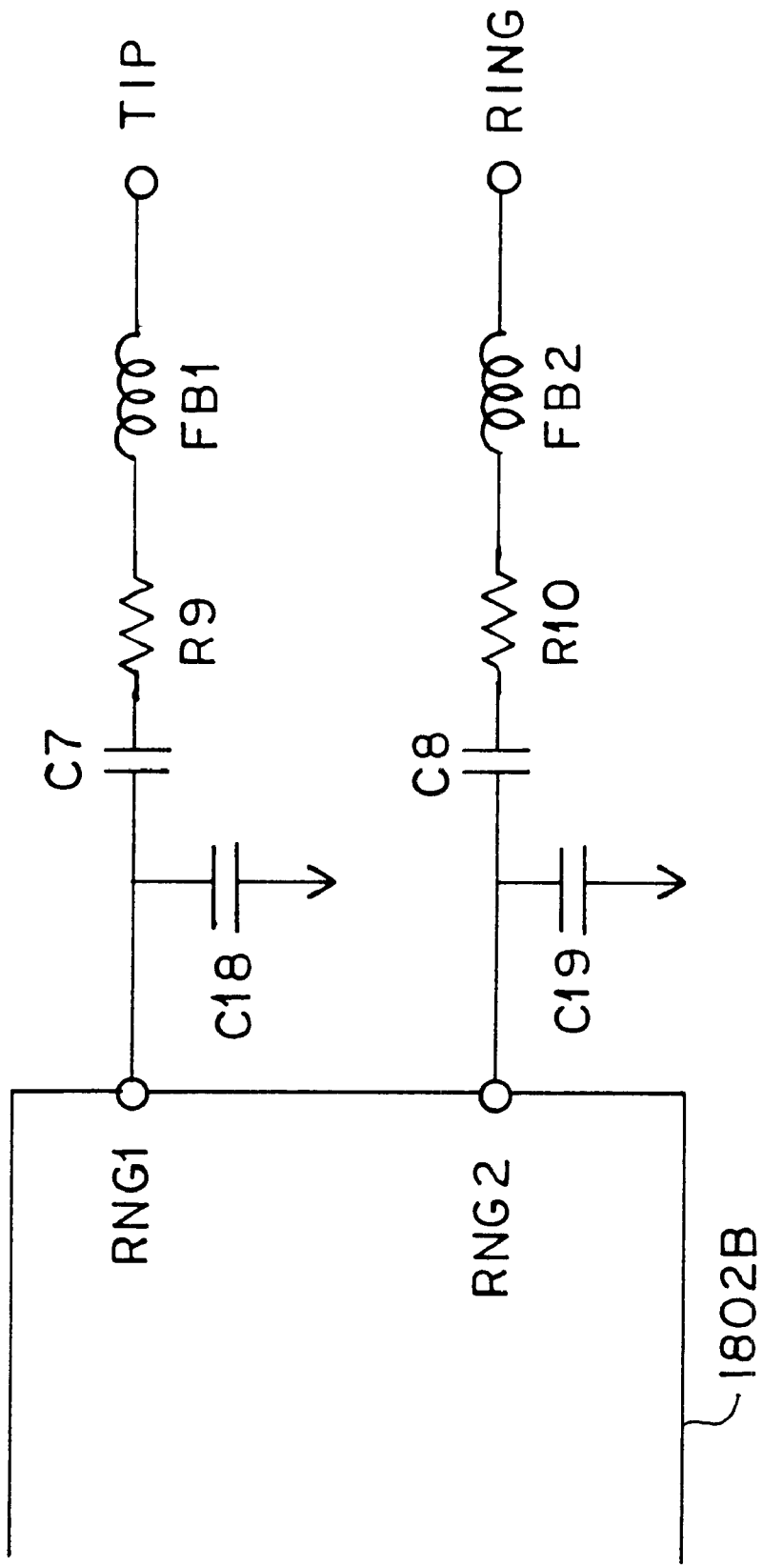
FIG. 5 is a schematic of the capacitive coupling of RNG1 and RNG2 to the TIP and RING lines.
Figure 6:
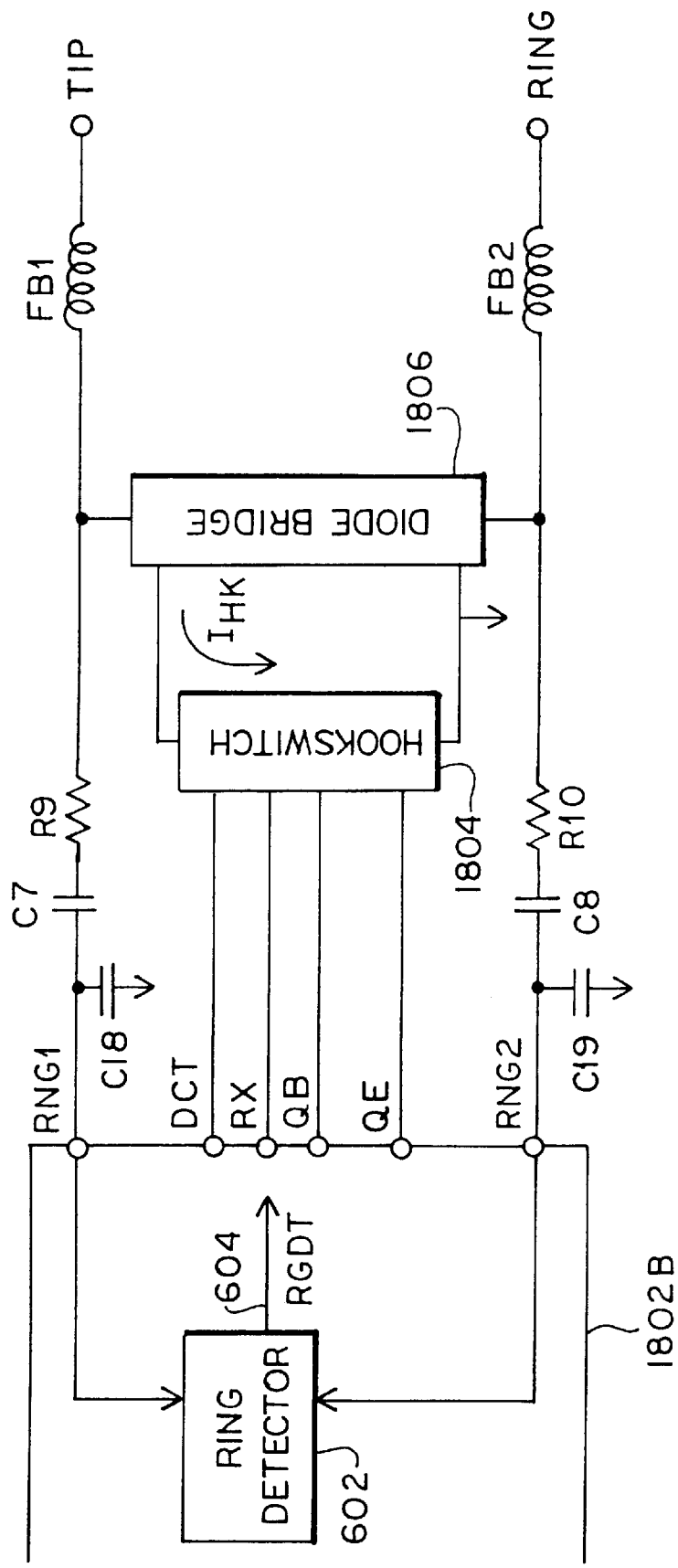
FIG. 6 is a block diagram of circuitry according to the present invention.

The synthesis of a ringer impedance by controlling the hookswitch current may be seen more clearly with respect to FIGS. 5–8. FIG. 5 illustrates a portion of the circuitry of FIG. 4 (as configured according to Table 1) which shows the path from the TIP and RING phone lines to the RNG1 and RNG2 inputs of the phone line side IC 1802B. The RNG1 and RNG2 inputs may be utilized in the detection of ringing and caller ID signals. The RNG1 and RNG2 inputs are capacitively coupled to the TIP and RING lines through capacitors C7, C8, C18, and C19 as shown in FIG. 5. At typical ring frequencies (for example 50 Hz), the ring detect circuitry will present a very high impedance to the phone line. For example using the values as shown in Table 1, the impedance seen by the phone line as a result of the circuitry of FIG. 5 will exceed 1 Mohm because of the relatively small capacitors used for C7, C8, C18, and C19. Such a high impedance far exceeds the maximum ringer impedance for those countries having an upper end ringer impedance limit such as the Czech Republic, Poland, South Africa and South Korea as described above. However, the use of small capacitors is desirable to minimize costs. The circuit of FIG. 6 provides a mechanism to lower the ringer impedance to satisfy various country specific specifications which have a maximum ringer impedance will still utilizing small capacitors to capacitively couple the RNG1 and RNG2 inputs.

FIG. 6 illustrates the diode bridge 1806 and hookswitch circuitry 1804 which is utilized to transmit and receive information to and from the phone line. The diode bridge 1806 and hookswitch circuitry 1804 may be seen with more detail in FIG. 4. As shown in FIG. 6, the RNG1 and RNG2 inputs are still capacitively coupled to the TIP and RING lines as in FIG. 5. According to the present invention, however, the impedance seen at the phone line is not primarily set by use of the capacitive circuitry coupled to the inputs RNG1 and RNG2. Rather, the impedance seen by the phone line is also impacted by a current $I_{HK}$ drawn from the phone lines through the hookswitch circuitry 1804 during a ringing event. By drawing the current $I_{HK}$, effective impedance seen at the TIP and RING lines is lowered. In one embodiment, the current $I_{HK}$ may be approximately 2.5 mA. In this manner, the ringer impedance may set sufficiently low to meet various maximum ringer impedance standards. Moreover, this ringer impedance may be achieved without the use of external discrete components added for the purpose of lowering the ringer impedance. Rather, existing external devices may be controlled in a manner to achieve the desired ringer impedance. The current drawn through the hookswitch circuitry to set the ringer impedance is drawn during a ringing event. Thus, the $I_{HK}$ current is drawn when the hookswitch is in an on-hook condition.

In a preferred embodiment the current drawn through the hookswitch circuitry which modifies the ringer impedance is between 1 and 5 mA and in a more preferred range between 2 and 3 mA. The amount of current drawn from the phone line through the hookswitch to achieve the desired ringer impedance is not unlimited because the current through the hookswitch will include a DC component. If too much DC current is drawn from the phone line, the phone line central office may assume an off-hook condition has occurred.

Using the values of Table 1 (at 50 Hz), the impedance seen at the phone lines from the capacitive coupling (FIG. 5) of the RNG1 and RNG2 inputs may be approximately 4 Mohms. However by drawing the $I_{HK}$ current of 2.5 mA, the impedance at 50 Hz drops to approximately 19 kohms. Thus, it can be seen that the current drawn through the hookswitch circuitry dominates the total ringer impedance seen by the phone line. The hookswitch circuitry in effect acts as an impedance ($Z_{EFFECTIVE}$) of approximately 20 kohms placed across the TIP and RING lines and the impedance seen by the phone line ($Z_{PHONE\ LINE}$) is approximately 19 kohms. Thus, an additional impedance is synthesized across the TIP and RING lines by use of the current drawn through the hookswitch devices and using the example described above, the ratio of $Z_{PHONE\ LINE}/Z_{EFFECTIVE}$ is approximately 95%. It will be recognized that other component values, current values and impedance values may be utilized while still obtaining the benefits of the techniques of the present invention. For example, the ratio of $Z_{PHONE\ LINE}/Z_{EFFECTIVE}$ may exceed 80% and more preferably exceed 90%. In this manner it may be seen that a substantial portion of the ringer impedance is set based upon the current drawn through the hookswitch. Thus, the impedance seen by the phone line is dominated by the synthesized impedance generated by the current drawn through the hookswitch devices as compared to the embodiment described above. In this manner the ringer impedance may be almost entirely set by the controlling the current through the hookswitch devices.

It will be recognized by those skilled in the art that it may not be desirable to draw the current $I_{HK}$ at all times. Thus, in one embodiment of the present invention the current $I_{HK}$ is only drawn through the hookswitch circuitry 1804 when a ring is detected. Circuitry for accomplishing this is shown in FIG. 6. As shown in FIG. 6, the phone line side IC 1802B receives ringing event information at the RNG1 and RNG2 inputs. This information is then transmitted to a ring detector 602 within the phone line side IC 1802B. The ring detector 602 then produces a signal RGDT which indicates whether a ring has been detected. The ring detector 602 may be programmable to support either full wave or half wave ring detection. The RGDT signal 604 may then be utilized to control the hookswitch circuitry 1804 (through the pins DCT, RX, QB, QE and QE2) to generate the $I_{HK}$ current draw described above. Thus, described herein is a technique to actively control the ringer impedance by adjusting the current provided through the hookswitch circuitry. The ring detect circuitry may utilize a comparator to determine if an absolute value of the Vrms on the TIP and RING line exceeds a predetermined threshold. When the Vrms exceeds the threshold a ringing event is indicated as having occurred by the RGDT signal.

As will be described below in more detail, a change in the RGDT signal 604 (which indicates that a ring burst is present on the phone line) will activate the $I_{HK}$ current used to set the ringer impedance. In the illustrative embodiment discussed herein, the $I_{HK}$ current may be a single predetermined value of 2.5 mA. In an alternative embodiment, however, the $I_{HK}$ current may be set to vary depending upon the magnitude of the ring burst voltage since the ringer impedance will vary with the Vrms of the ring burst provided on the phone line (Z=V/I). For example, the ring signal indicating ringing conditions may vary from 40 to 140 Vrms within a single country. Thus, an alternate approach may involve utilizing a ring detect signal that indicates the magnitude of the ringing voltage and corresponding hookswitch circuitry that will utilize the detected to magnitude to provide an $I_{HK}$ current that is dependent upon the value of the ringing voltage.

Figure 8:
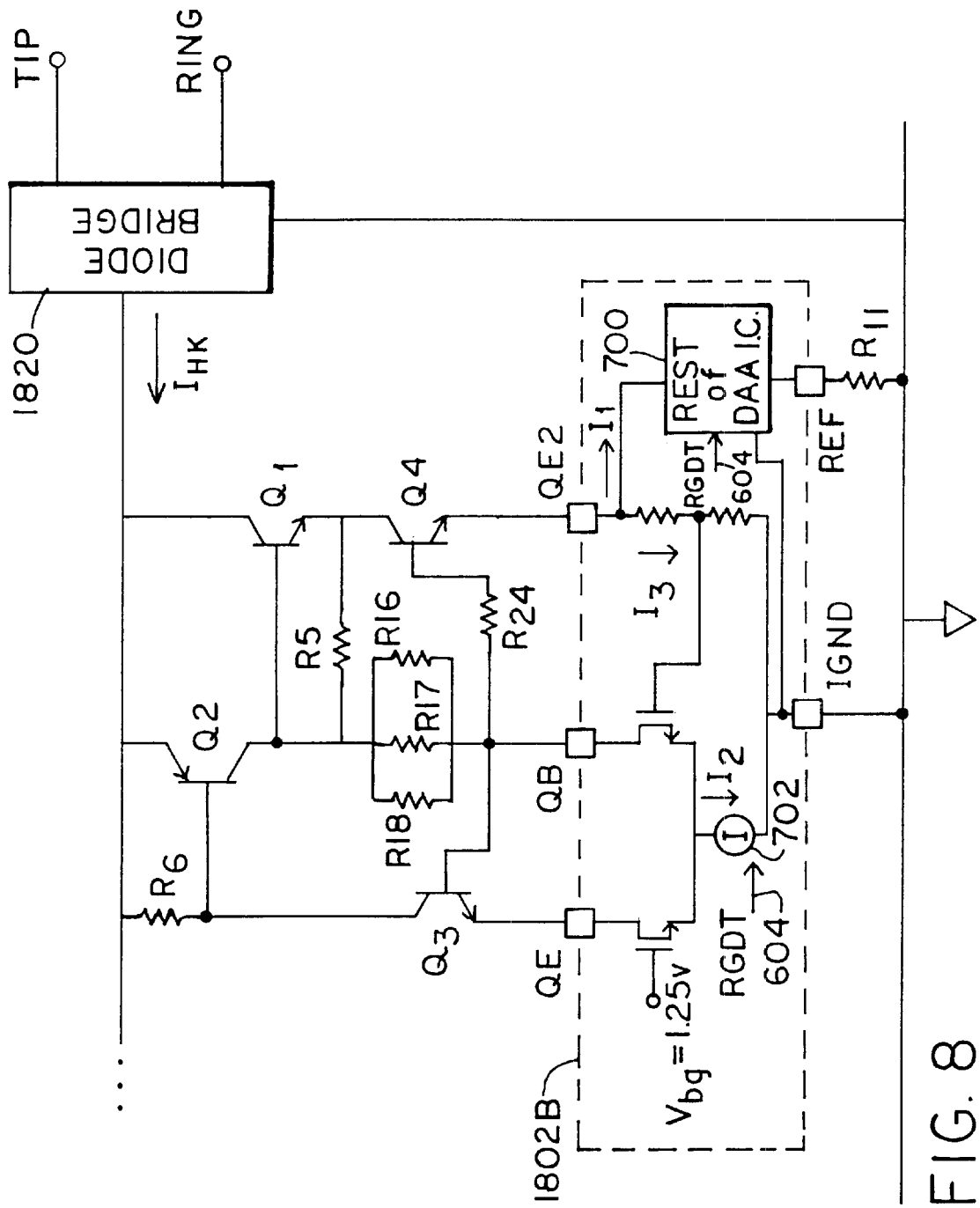
FIG. 8 is a circuit diagram illustrating the use of hookswitch circuitry to provide an $I_{HK}$ current.

An example, hookswitch circuit for providing a 2.5 mA current in response to the RGDT signal 604 is shown in FIG. 8. As seen in FIG. 8, the TIP and RING lines are provided to the diode bridge 1820. The diode bridge is coupled to the phone line side DAA integrated circuit 1802B through the hookswitch circuitry which includes transistors Q1, Q2, Q3 and Q4 and associated resistors. The hookswitch circuitry shown herein is merely exemplary, and many other hookswitch circuits may utilize the techniques of the present invention. The phone line side DAA integrated circuit 1802B is indicated by the dashed line and includes input/output pins QE, QB, QE2, IGND, and REF. The DAA integrated circuit 1802B includes a current source 702 which is coupled to IGND and a pair of transistors and resistors as shown. The remaining portion of the DAA integrated circuit is shown as block 700.

The DAA integrated circuit 1802B operates in response to the RGDT 604 signal to generate an approximately 2.5 mA current $I_{HK}$. The RGDT signal 604 is applied to current source 702 such that when the RGDT signal indicates a ringer event, the current source 702 turns on as a 30 uA current source. The RGDT signal 604 is also applied to block 700. In response to the indication of a ring on the RGDT signal 604, a reference voltage may be applied to the REF pin. Coupled to the REF pin is a precision (1%) 10 kohms resistor. Thus a precise current will exist at the REF pin. This current may then be mirrored within the DAA integrated circuit block 700 to create a total $I_{HK}$ current of 2.5 mA ($I_1+I_2+I_3$).

Figure 7:
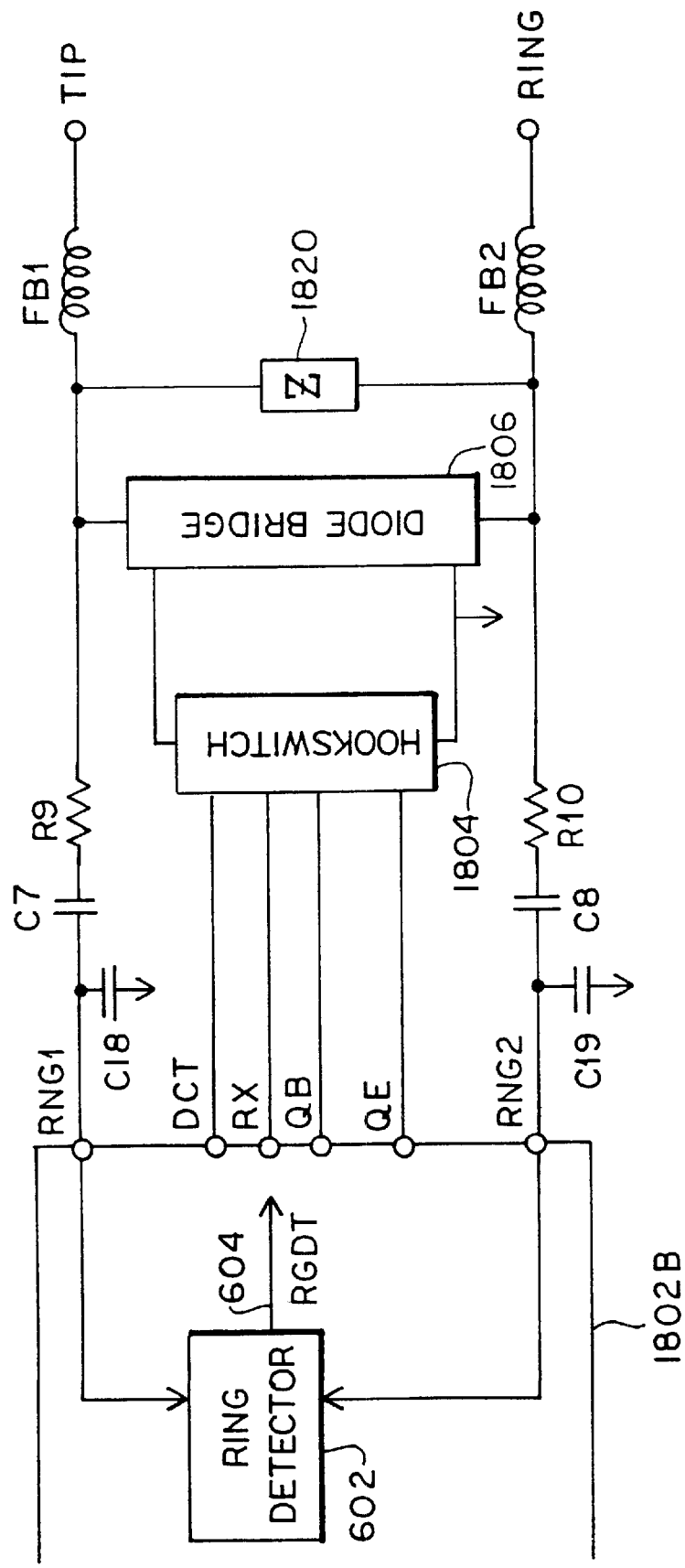
FIG. 7 is a block diagram of a circuit using additional impedance devices coupled to the TIP and RING lines.

As mentioned above, utilizing the circuit of FIG. 6 with an $I_{HK}$ current of 2.5 mA will provide approximately 19 kohms ringer impedance. This ringer impedance will satisfy the maximum ringer impedance standards of most country specifications except those of the Czech Republic (10 kohms). Thus as shown in FIG. 7, an impedance structure 1820 is also provided across the TIP and RING lines. The impedance structure provides an impedance in parallel with the capacitive coupled circuitry of FIG. 5, thus, lowering the impedance seen by the phone line (TIP and RING). The impedance structure may be configured in a wide range of manners with a wide range of impedance devices to provide a desired impedance across the TIP and RING lines. An exemplary design for the impedance structure is shown in FIG. 4. As shown in FIG. 4, the impedance structure 1820 may be formed from a capacitor C15 coupled to a resistor R14 which is coupled to zener diodes Z2 and Z3 (exemplary values of these devices may be seen in Table 1). Because the impedance structure 1820 is utilized, current does not need to be drawn through the hookswitch to satisfy the impedance requirements.

Using the values of Table 1 (at 50 Hz), the impedance seen at the phone lines from the capacitive coupling (FIG. 5) of the RNG1 and RNG2 inputs may be approximately 4 Mohms and the impedance of the impedance structure 1820 may be approximately 9 kohms and without the use of a current $I_{HK}$, the total impedance at the phone lines from these two terms would be approximately 8 kohms. As mentioned above, when an impedance structure 1820 is utilized current does not have to be drawn through the hookswitch to achieve the desired impedance. Thus, it may be desirable to allow the user to program the DAA integrated circuitry to select whether the $I_{HK}$ current is activated upon the detection of a ring. For example by providing a programmable system, a user may indicate that the DAA is being utilized in any country other than the Czech Republic. In this mode, the $I_{HK}$ current may be controlled to be activated upon RGDT signal indicating a ring. However, if the system is to be used in the Czech Republic (i.e. the structure 1820 is utilized), the $I_{Hk}$ current is not required and the system may be set to not activate the $I_{Hk}$ current (i.e. ignore the RGDT signal with respect to the hookswitch current).

Though not shown, it may be desirable to utilize both the $I_{Hk}$ current and the impedance structure at all times or for some specific countries. Thus, the $I_{Hk}$ current and the values of the impedance structure 1820 may be selected to achieve the user's desired impedance.

Further modifications and alternative embodiments of this invention will be apparent to those skilled in the art in view of this description. Accordingly, this description is to be construed as illustrative only and is for the purpose of teaching. those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art.

We claim:

1. A communication system, comprising:

phone line side circuitry capable of being coupled to phone lines;

powered side circuitry capable of being coupled to the phone line side circuitry through an isolation barrier; and hookswitch circuitry within the phone line side circuitry, the hookswitch circuitry drawing current during ringer events to synthesize a ringer impedance.

2. The communication system of claim 1, further comprising a ring detect signal coupled to the hookswitch circuitry, the ring detect signal controlling the hookswitch circuitry to activate the current drawn through the hookswitch circuitry during ringer events.

3. The communication system of claim 2, further comprising an impedance structure coupled between the phone lines.

4. The communication system of claim 3, further comprising the isolation barrier coupled between the phone line side circuitry and the powered side circuitry, the isolation barrier being a capacitive barrier.

5. The communication system of claim 2, the system being country programmable to selectively draw the current.

6. The communication system of claim 1, the system being country programmable to selectively draw the current.

7. The communication system of claim 1, further comprising the isolation barrier coupled between the phone line side circuitry and the powered side circuitry, the isolation barrier being a capacitive barrier.

8. The communication system of claim 1, wherein the phone line side circuitry and the powered side circuitry are configured to communicate across the isolation barrier through digital signals, wherein the digital signals include a digital phone line data stream multiplexed with control data before the digital signals are sent across the isolation barrier.

9. The communication system of claim 8, further comprising the isolation barrier coupled between the phone line side circuitry and the powered side circuitry, the isolation barrier comprising one or more capacitors.

10. A method of operating a communication system capable of being coupled to a phone line, comprising:

coupling an isolation barrier between powered circuitry and phone line side circuitry;

providing hookswitch circuitry within the phone line side circuitry; and generating a substantial portion of a ringer impedance seen at the phone line by drawing current through the hookswitch circuitry.

11. The method of claim 10, further comprising utilizing a capacitive barrier to isolate the powered circuitry and the phone line circuitry.

12. The method of claim 11, further comprising passing digital signals across the isolation barrier.

13. The method of claim 12 wherein the digital signals include a digital phone line data stream multiplexed with control data before the digital signals are sent across the isolation barrier.

14. The method of claim 12, further comprising utilizing a capacitive barrier to isolate the powered circuitry and the phone line circuitry.

15. The method of claim 14, further comprising controlling the current drawn through the hookswitch circuitry during a ringing event through the use of ring detect circuitry.

16. The method of claim 15, further comprising providing a portion of the ringer impedance with an impedance structure coupled to the phone line.

17. The method of claim 15, wherein the current drawn through the hookswitch exceeds 1 mA.

18. A ringer impedance circuit within a communication system capable of being connected to phone lines, the ringer impedance circuit comprising:

a ringer detect signal; and at least one impedance generating circuit coupled to the ringer detect signal, the at least one impedance generating circuit responsive to the ringer detect signal to provide a ringer impedance.

19. The ringer impedance circuit of claim 18, the impedance generating circuit being a hookswitch circuit.

20. The ringer impedance circuit of claim 18, wherein the impedance generating circuit synthesizes an impedance at the phone lines by drawing current from the phone line.

21. The ringer impedance circuit of claim 20, the impedance generating circuit being a hookswitch circuit.

22. The ringer impedance circuit of claim 20, a majority of the ringer impedance at the phone line being an effective impedance generated by the impedance generating circuit.

23. The ringer impedance circuit of claim 20, the hookswitch circuit including at least one transistor.

24. The ringer impedance circuit of claim 18, further comprising an impedance structure coupled to the phone lines, the impedance structure providing an impedance independent of the ring detect signal.

25. A method of providing a ringer impedance capable of satisfying a plurality of ringer impedance standards, comprising:

generating a ring detect signal; and adjusting the ringer impedance present at a phone line in response to the ring detect signal.

26. The method of claim 25, wherein said adjusting comprises altering the current flow through at least one circuit coupled to the phone line.

27. The method of claim 26, wherein the at least one circuit comprises a hookswitch circuit.

28. The method of claim 27, wherein the current flow exceeds 1 mA.

29. A method of generating a ringer impedance for a phone line, comprising:

actively controlling at least one circuit of a DAA circuit; and substantially setting the ringer impedance present at the phone line by the active control of the at least one circuit.

30. The method of claim 29, wherein the actively controlling further comprises adjusting the current flow through the at least one circuit.

31. The method of claim 30, wherein the at least one circuit comprises at least a portion of a hookswitch circuit.

32. The method of claim 29, wherein the actively controlling further comprises controlling the at least one circuit in response to detecting a ringer event.

33. The method of claim 32, wherein the actively controlling further comprises adjusting the current flow through the at least one circuit.

34. The method of claim 33, wherein the at least one circuit comprises at least a portion of a hookswitch circuit.

35. An integrated circuit compatible with a plurality of phone line standards having ringer impedance requirements, the integrated circuit comprising:

a ringer detect signal; and at least one control signal generated in response to the ringer detect signal, the control signal operable to adjust the ringer impedance present at a phone line.

36. The integrated circuit of claim 35, the control signal capable of adjusting the current flow through at least one circuit coupled to the phone line so as to adjust the ringer impedance.

37. The integrated circuit of claim 36, the at least one circuit being external to the integrated circuit.

* * * * *

UNITED STATES PATENT AND TRADEMARK OFFICE
CERTIFICATE OF CORRECTION

PATENT NO. : 6,522,745 B1
DATED : February 18, 2003
INVENTOR(S) : George Tyson Tuttle et al.

It is certified that error appears in the above-identified patent and that said Letters Patent is hereby corrected as shown below:

Column 13,
Lines 11 and 50, please change "capable of being" to -- configured to be --.

Column 14,
Line 15, please change "capable of being" to -- configured to be --.
Line 41, please change "capable of" to -- for --.

Signed and Sealed this

Eighth Day of April, 2003

JAMES E. ROGAN
*Director of the United States Patent and Trademark Office*